United States Patent
Craik et al.

(10) Patent No.: US 10,936,290 B2
(45) Date of Patent: Mar. 2, 2021

(54) COMPILE-TIME FOLDING OF ASSUMED CONSTANT VALUES

(71) Applicant: INTERNATIONAL BUSINESS MACHINES CORPORATION, Armonk, NY (US)

(72) Inventors: Andrew James Craik, North York (CA); Nicholas James Coughlin, Brisbane (AU); Graham Alan Chapman, Nepean (CA); Daniel Heidinga, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 65 days.

(21) Appl. No.: 16/204,594

(22) Filed: Nov. 29, 2018

(65) Prior Publication Data
US 2020/0174763 A1    Jun. 4, 2020

(51) Int. Cl.
*G06F 8/41* (2018.01)
*G06F 9/455* (2018.01)

(52) U.S. Cl.
CPC ............ *G06F 8/443* (2013.01); *G06F 9/4552* (2013.01)

(58) Field of Classification Search
CPC . G06F 8/437; G06F 8/443; G06F 8/70; G06F 9/264; G06F 9/30021; G06F 9/30134; G06F 9/30145; G06F 9/30167; G06F 9/3017; G06F 9/30174; G06F 9/30181; G06F 9/345; G06F 9/3802; G06F 9/44521; G06F 9/449; G06F 9/45504; G06F 9/45508; G06F 9/45516; G06F 9/4552;
(Continued)

(56) References Cited

U.S. PATENT DOCUMENTS

| 7,840,950 B2 | 11/2010 | Stoodley et al. |
| 2003/0046449 A1* | 3/2003 | Gray-Donald et al. ................ G06F 9/45504 719/330 |

(Continued)

OTHER PUBLICATIONS

Rodriguez-Cando et al., "Automatic Microbenchmark Generation to Prevent Dead Code Elimination and Constant Folding", ASE 2016, Sep. 3-7, 2016, Singapore, Singapore, http://dx.doi.org/10.1145/2970276.2970346, 12 pages.

(Continued)

*Primary Examiner* — Wei Y Zhen
*Assistant Examiner* — Mohammed N Huda
(74) *Attorney, Agent, or Firm* — Michael O'Keefe; Andrew D. Wright; Roberts Calderon Safran & Cole, P.C.

(57) ABSTRACT

A computer-implemented method includes: selecting, by a computer device, a set of fields in a program which are marked as final fields to be treated as constants; adding, by the computer device, detection logic to the program, the detection logic including a process that detects writes to the final fields to be treated as constants; compiling, by the computer device, the program into compiled code; executing, by the computer device, the compiled code; detecting, by the computer device, a write to a first one of the final fields to be treated as constants; and transitioning, by the computer device, execution of the compiled code from the compiled code to an interpreter for processing by compensation code that operates on the first one of the final fields to be treated as constants.

20 Claims, 7 Drawing Sheets

(58) Field of Classification Search
CPC .............. G06F 11/3409; G06F 11/3466; G06F 11/3688; G06F 8/41; G06F 9/455
USPC ........................................................ 717/148
See application file for complete search history.

(56) References Cited

U.S. PATENT DOCUMENTS

| | | | |
|---|---|---|---|
| 2007/0240135 A1* | 10/2007 | Stoodley et al. ... | G06F 9/45516 717/140 |
| 2015/0052507 A1 | 2/2015 | Ji et al. | |
| 2015/0363174 A1* | 12/2015 | Rose et al. ................ | G06F 8/31 717/114 |
| 2016/0062878 A1* | 3/2016 | Westrelin et al. .... | G06F 9/4552 717/130 |
| 2016/0306847 A1 | 10/2016 | Ding et al. | |
| 2019/0034178 A1* | 1/2019 | Goetz et al. ............ | G06F 8/443 |

OTHER PUBLICATIONS

Mell et al., "The NIST Definition of Cloud Computing", NIST, Special Publication 800-145, Sep. 2011, 7 pages.

* cited by examiner

COMPILE-TIME FOLDING OF ASSUMED CONSTANT VALUES

BACKGROUND

The present invention relates generally to computer programming and, more particularly, to compilation technology and optimizing compiling by assuming constant values.

Computer programs are usually first written in source code, which is written in a specific programming language. However, in some cases, the source code cannot be run directly by the computer. In these cases, in order for the code to be recognized by the computer's CPU, it must be converted from one language (typically high-level source code) into machine code (a low-level language). This process is referred to as compiling the code.

SUMMARY

In a first aspect of the invention, there is a computer-implemented method including: selecting, by a computer device, a set of fields in a program which are marked as final fields to be treated as constants; adding, by the computer device, detection logic to the program, the detection logic including a process that detects writes to the final fields to be treated as constants; compiling, by the computer device, the program into an executable format; executing, by the computer device, the compiled code; detecting, by the computer device, a write to a first one of the final fields to be treated as constants; and transitioning, by the computer device, execution of the compiled code from the compiled code to an interpreter for processing by compensation code that operates on the first one of the final fields to be treated as constants.

In another aspect of the invention, there is a computer program product including a computer readable storage medium having program instructions embodied therewith. The program instructions are executable by a computing device to cause the computing device to: select a set of fields in a program which are marked as final fields to be treated as constants; add detection logic to the program, the detection logic including a process that detects writes to the final fields to be treated as constants; compile the program into compiled code; execute the compiled code; detect a write to a first one of the final fields to be treated as constants; and transition execution of the compiled code from the compiled code to an interpreter for processing by compensation code that operates on the first one of the final fields to be treated as constants.

In another aspect of the invention, there is system including a processor, a computer readable memory, and a computer readable storage medium. The system includes program instructions to: select a set of fields in a program which are marked as final fields to be treated as constants; add detection logic to the program, the detection logic including a process that detects writes to the final fields to be treated as constants; compile the program into compiled code; execute the compiled code; detect a write to a first one of the final fields to be treated as constants; and transition execution of the compiled code from the compiled code to an interpreter for processing by compensation code that operates on the first one of the final fields to be treated as constants. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
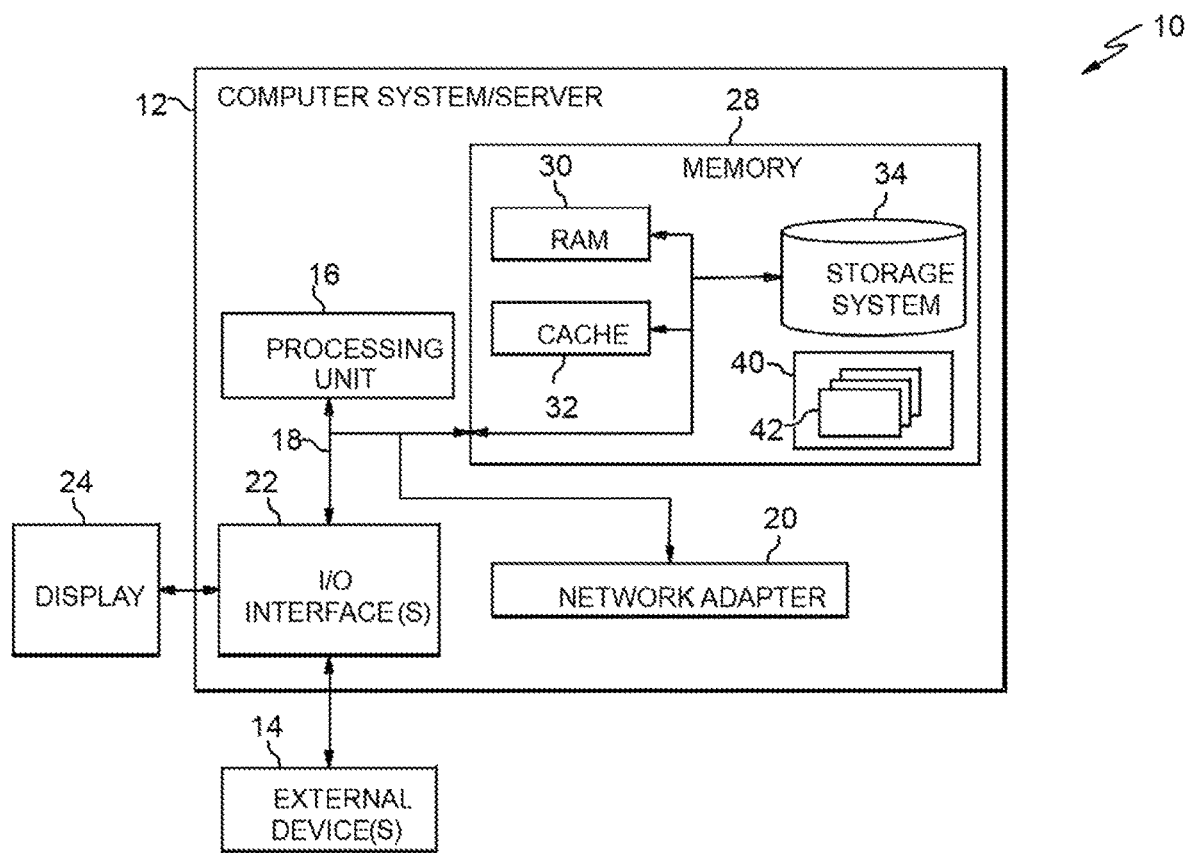
FIG. 1 depicts a cloud computing node according to an embodiment of the present invention.

The present invention relates generally to compilation technology and, more particularly, to optimizing compiling by assuming constant values. According to aspects of the invention, a computer device selects fields in a program to be treated as constants by identifying those marked as "static final" fields; the computer device sets constant values for the static final fields (embodiments allow the just in time compiler (JIT) to "trust" that the user won't write to anything marked as static final and if it is written to, compensate for the incorrect assumptions); the computer device adds detection logic to the program, the detection logic including a process that detects writes to the final fields; the computer device compiles the program into compiled code; the computer device executes the compiled code; the computer device detects a write to a first one of the final fields; and the computer device transitions execution of the compiled code from the compiled code to an interpreter for processing by compensation code that operates on the first one of the final fields. In embodiments, the compensation code treats the first one of the final fields as a variable. In this manner, implementations of the invention increase the speed of a program in which certain fields can be treated as constants in many cases, and treats those fields as variables when processing accuracy requires those fields to be treated as variables.

Advantageously, embodiments of the invention provide improvements to the functioning of a computer. By treating a variable field as a constant, a computer runs a program more quickly and efficiently, resulting in the use of less computing resources. While treating the variable field as a constant, embodiments detect any writes to that field so that the field is then treated as a variable by transitioning processing from compiled code to an interpreter for processing involving that field. Embodiments of the invention also employ an unconventional arrangement of steps including: compiling code with the JIT; the JIT making assumptions about the code (that final fields will not be modified) so that common paths through the code are made faster while also handling cases where the assumptions are invalidated; and transitioning from the compiled code to an interpreter when an assumption is invalidated (an assumed constant static final field is written to). The combination of steps is unconventional and produces an effect greater than the sum of the parts—namely the ability to speculatively treat program values as constants.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
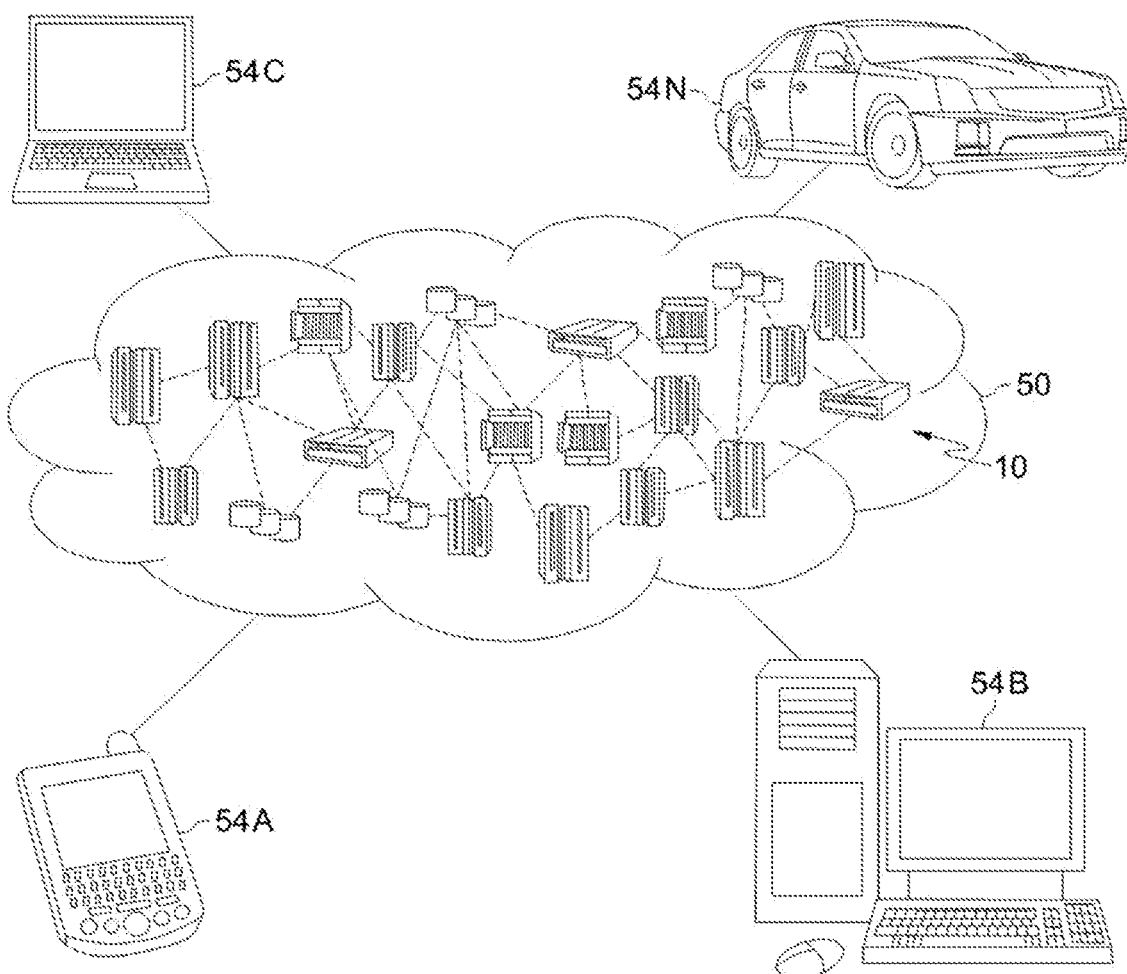
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
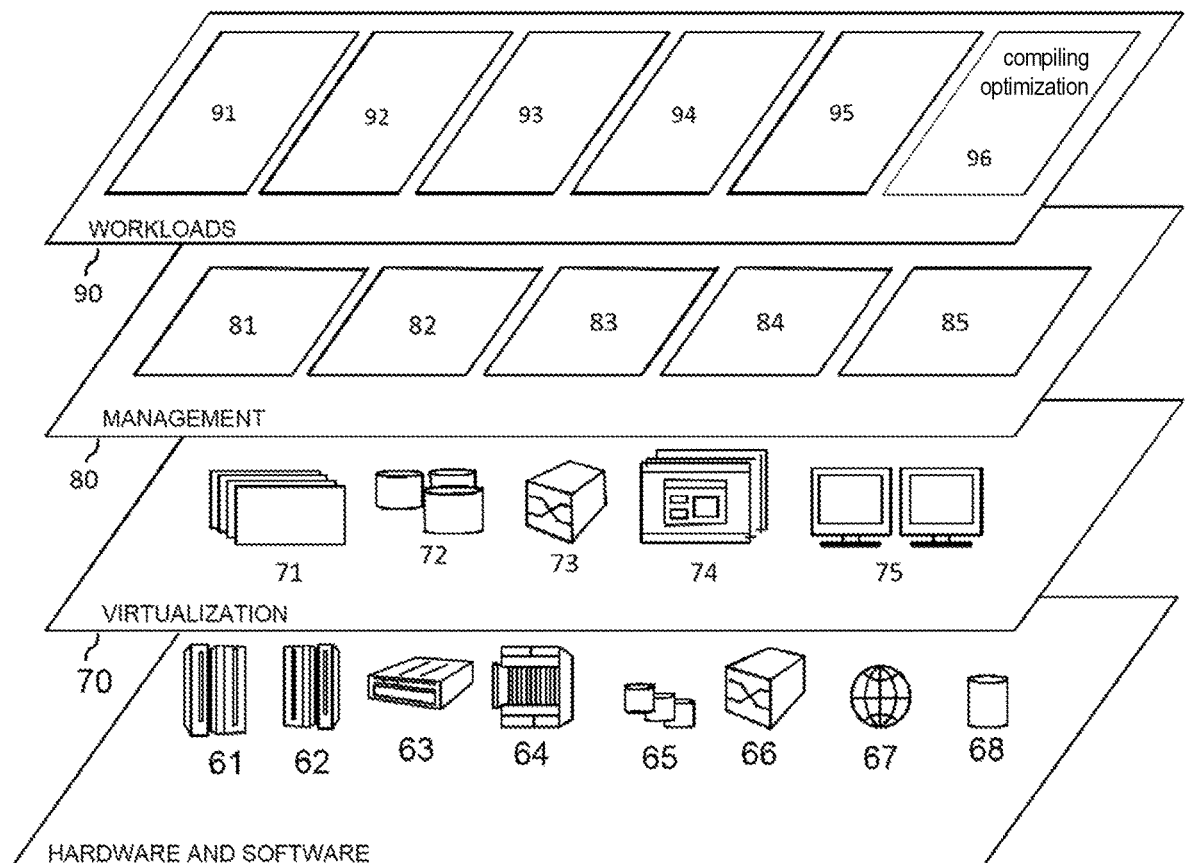
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compiling optimization 96.

Implementations of the invention may include a computer system/server 12 of FIG. 1 in which one or more of the program modules 42 are configured to perform (or cause the computer system/server 12 to perform) one of more functions of the compiling optimization 96 of FIG. 3. For example, the one or more of the program modules 42 may be configured to: select variable fields in a program to be treated as constants and marked as final fields; set constant values for the final fields; add detection logic to the program, the detection logic including a process that detects writes to the final fields; compile the program into compiled code; execute the compiled code; detect a write to a first one of the final fields; and transition execution of the compiled code from the compiled code to an interpreter for processing by compensation code that operates on the first one of the final fields.

Some general-purpose computer-programming languages, such as, for example, Java, allow for the definition of fields in classes. These fields are used to store data and can be declared with additional modifiers to limit their use or change how they are associated with the declaring class and its instances. Two examples of such keywords are static and final. A static field is associated with the class, rather than an instance of it, whilst a final field must not be modified after the object initialization has completed (e.g., once the instance constructor has returned). Both can be applied to the same field, limiting its modification to during class initialization (e.g., while the class' static initializer is running).

Some virtual machines, such as, for example, Java Virtual Machines (JVMs), include a Just-in-Time (JIT) compiler which translates a compiled application (for example in Java bytecode) into an equivalent native implementation. The JIT compiler may apply transformations to optimize the program during the process of compilation. It is often desirable, during these optimizations, to identify constants because they simplify analysis and potentially enable additional transformations. Examples of such simplification include, for example: eliminating a check, if the condition can be evaluated during compilation; eliminating memory accesses, if the constant value was originally read from memory; simplifying calculations, by pre-computing values and using more efficient implementations; and simplifying loop analysis, if the identified constant is used as part of a loop controlling test.

Some developers store constants in fields marked as static and final, and doing so creates a central location to change the value which can simplify later development. The ability to identify these fields as constant would, therefore, most likely be beneficial to the JIT compiler and the performance of the code it produces. The Java language, for example, includes a number of mechanisms by which a final field, both instance and static, can be modified outside of the instance and static initializers respectively. These mechanisms include the reflection API, the Unsafe API and the Java Native Interface (JNI). The JIT compiler is not, therefore, able to assume that the value of a final field is constant, even though it will be in a majority of cases. Real-world code depends on final field modifications being reflected in the executing program.

One approach to optimization is to generate a fast execution path capable of managing the expected case with greater performance due to simplifying assumptions, as well as a series of fallback paths, to handle the cases where these assumptions may have been invalidated. For example, this can be applied when inlining a call by introducing the inlined body as a fast path, but retaining the original call on a fallback path. The creation of these additional paths can introduce significant compile time overhead through the cost of maintaining these paths in future optimization passes, and the memory overhead due to the increased code size. In some cases, like method inlining, the benefits outweigh these costs. However, for cheaper, more frequent operations, such as, for example, field loads, the cost of inserting frequent fallback paths is likely to become prohibitive. Further, any optimizations applied to code that is after the merge point for the fast and fallback paths cannot benefit from the fast path's simplifying assumptions because their transformations (optimizations) must be valid for all paths.

An alternative approach to the generation of fallback paths is to utilize On Stack Replacement (OSR). OSR is a technology that allows compiled code to transition execution back to the runtime's interpreter at defined points. This is achieved by maintaining bookkeeping sufficient to recreate the interpreter's execution state from the compiled code's execution state at a set of predetermined points in the original program. The compiled implementation can then use the interpreter as its fallback path by maintaining the necessary transition state information before a simplifying assumption is made, and execution can transition to the interpreter if the assumption is ever invalidated. This significantly reduces the overheads from code duplication and eliminates the merge of the fallback path(s) because execution will not return from the interpreter. This allows subsequent optimizations to potentially benefit from the fast path's simplifying assumption(s).

Embodiments of the invention include techniques which allow a JIT compiler to selectively treat the value loaded from fields as constants while adding compensation infrastructure which transitions execution from the compiled code to the interpreter should an assumed constant field be modified. Embodiments of this technique are applied in the context of Java applications to treat the value of fields marked as static and final as compile-time constants once the containing class has finished initialization. Embodiments are applied to other languages or any other contexts where it is desirable to treat a loaded value as an effective constant with a transition to the interpreter setup to prevent using the constant value if it is modified after compilation has completed.

Some programmers analyze programs, such as, for example, Java programs, to identify fields that can be labelled as final and/or static based on their use. In some cases, these labels/modifiers are left out when they could have been applied, to the potential determent of verification and optimization. Embodiments include, in addition to methods of this disclosure, identifying fields that can be labelled as final and/or static (based on their use) to increase the opportunities for constant folding. This is useful given the limited use of final labels in many application designs. Embodiments use an existing OSR implementation and build on top of FEAR analysis, which provides an infrastructure in which assumptions can be made and protected using a minimal set of OSR transitions points. Embodiments designate static final fields as remaining constant and treat them as constant during compilation.

In embodiments of the invention, an optimizing compiler treats a runtime loaded value as a constant while adding protective transition points which can be used to transition execution to the interpreter in case the constants are modified once compilation has completed.

Figure 4:
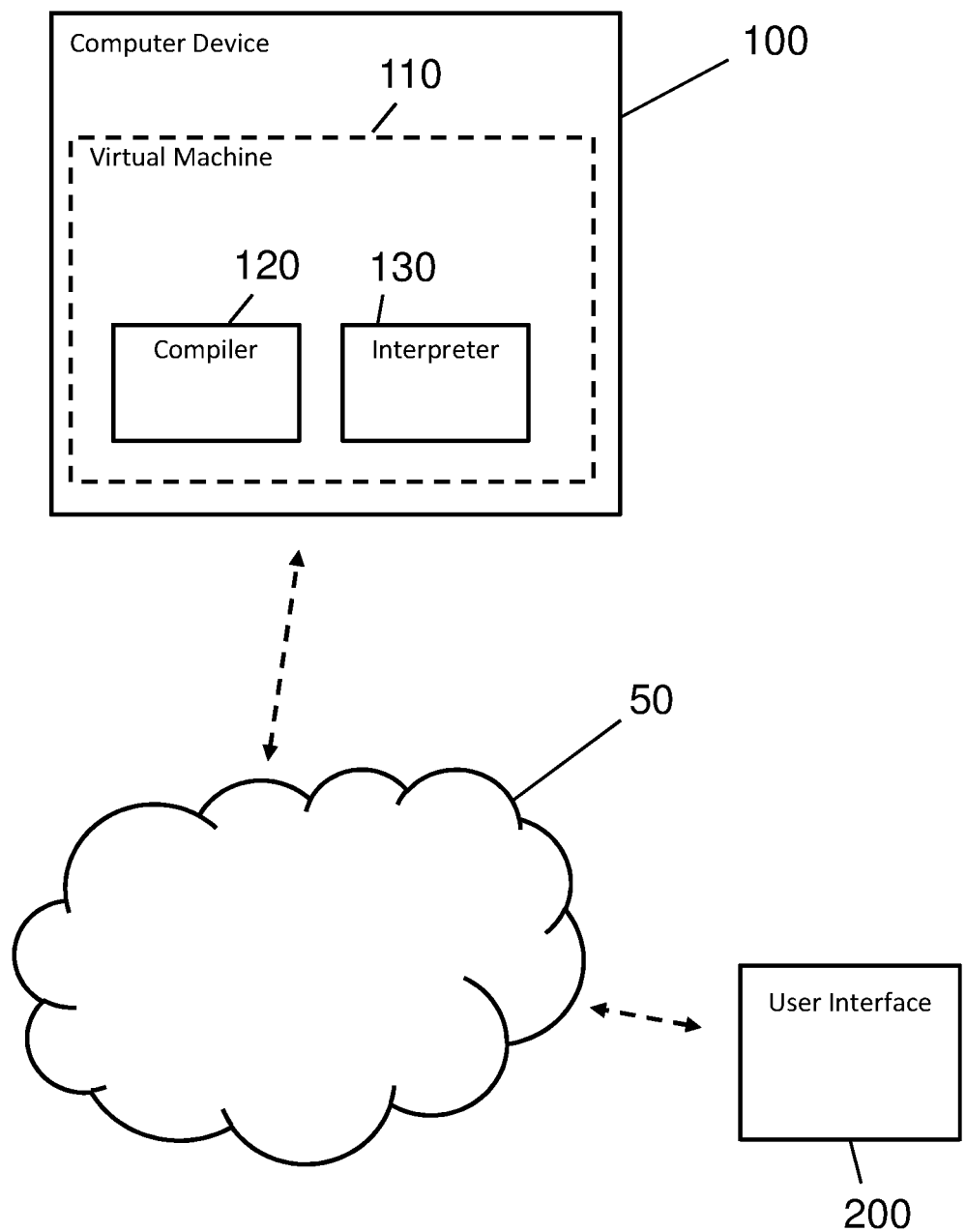
FIG. 4 shows a block diagram of an exemplary environment in accordance with aspects of the invention.

FIG. 4 shows a block diagram of an exemplary environment in accordance with aspects of the invention. In embodiments, the environment includes a computer device 100, such as, for example, computer system/server 12 shown in FIG. 1. In embodiments, the computer device 100 includes a compiler 120 and an interpreter 130. In embodiments, the compiler 120 compiles a computer program into compiled code that is readable by the computer device 100, a virtual machine 110 existing on computer device 100 or elsewhere, or another computer system/server that runs compiled code. In embodiments, the compiler 120 compiles a computer program into an intermediate language such as, for example, Java bytecode, that is then interpreted by interpreter 130. In the example shown in FIG. 4, the virtual machine 110 exists on the computer device 100. In other embodiments, the virtual machine 110 exists outside of the computer device 100 on, for example, a separate computer system/server device (for example, another instance of the computer system/server 12). The embodiment shown in FIG. 4 includes a user interface 200 through which a user accesses the computer device 100. In this example, the computer device 100 is accessed through the cloud computing environment 50, with the computer device 100 being a node 10 and the user interface 200 being a client device 54 A-N as shown in FIG. 2. The user interface 200 is, in this example, a terminal at which the user writes the program processed by the computer device 100.

In the example shown in FIG. 4, the compiler 120 and the interpreter 130 are on the same virtual machine 110 on the same computer device 100. In other embodiments, the compiler 120 is located on a different computer system/server (for example, the computer system/server 12) than the interpreter 130. In other embodiments, the compiler 120 is located on the virtual machine 110 on the computer device 100 and the interpreter 130 is located on a different virtual machine on the computer device 100. In embodiments, other processing modules and/or other functions such as, for example, garbage collection, are located on the computer device 100, the virtual machine 110, other computer systems/servers, or any combination of these.

Figure 5:
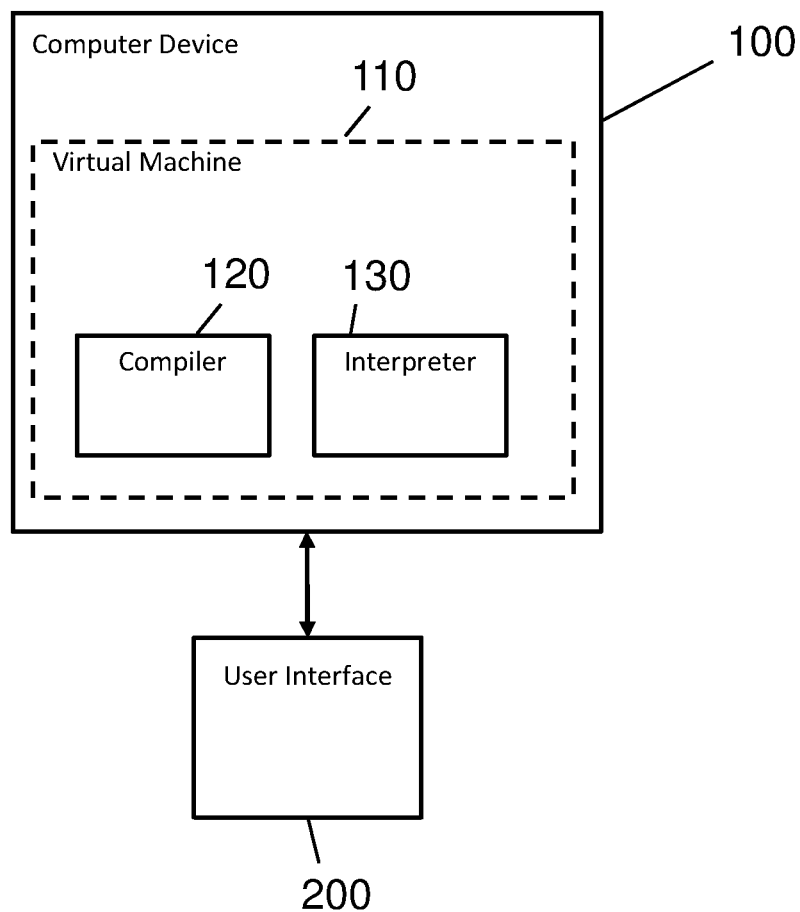
FIG. 5 shows a block diagram of an exemplary environment in accordance with aspects of the invention.

FIG. 5 shows an example of the computer device 100 that is not cloud based. In the example in FIG. 5, the user interface 200 is connected by, for example, a wired or a wireless connection to the computer device 100. In embodiments, the computer device 100 and the user interface 200 are in the same location.

Figure 6:
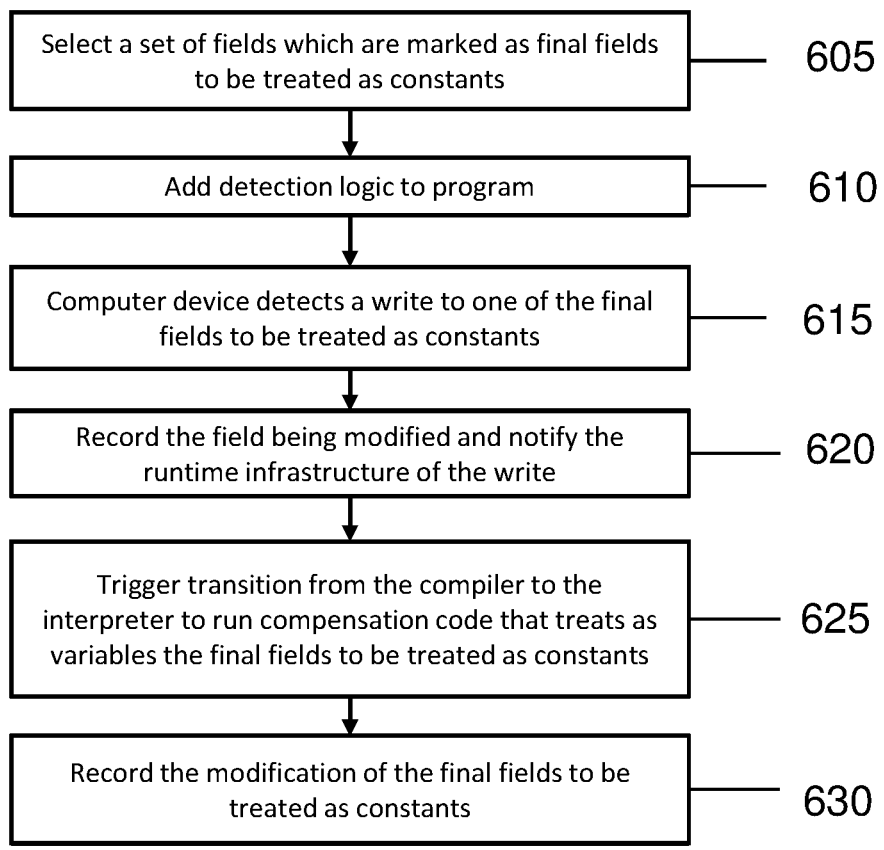
FIG. 6 shows a flowchart of an exemplary method in accordance with aspects of the invention.

FIG. 6 shows a flowchart of an exemplary method in accordance with aspects of the present invention. Steps of the method may be carried out in the environments of FIG. 4 and FIG. 5 and are described with reference to elements depicted in FIG. 4 and FIG. 5.

At step 605, the user, by the computer device 100, selects a set of fields which are marked as final fields that are to be treated as constants (speculated).

At step 610, the computer device 100 adds detection logic to the program (for example, an interpreter loop) run on the interpreter 130 to detect memory writes which modify fields whose values have been set as constants. For example, in embodiments, the computer device 100 adds detection logic to: the bytecode interpreter loop (for the putstatic opcode); the JNI interface ( ); the Unsafe API (put operations with base objects representing writes to static fields); and the various reflection APIs supplied by the language.

At step 615, the computer device 100 detects a write to a final field to be treated as a constant. At step 620, the runtime records which field has been modified and notifies the runtime infrastructure of the compiler 120 of the write so that, in step 625, the runtime infrastructure triggers any transitions (from the compiler 120 to the interpreter 130) required to prevent running code where the field's value was treated as a constant at compile time.

At step 630, for example, the compiler 120 stores in a single bit on the class a record of whether any of the static final fields to be treated as constants in the class have been modified post initialization. This is done to reduce the amount of memory required to store the book keeping information and to reduce the complexity involved in checking if a final field to be treated as a constant has been modified. In embodiments, the class marker persists into future compilations, preventing repeated assumptions which are known to potentially be invalid.

Figure 7:
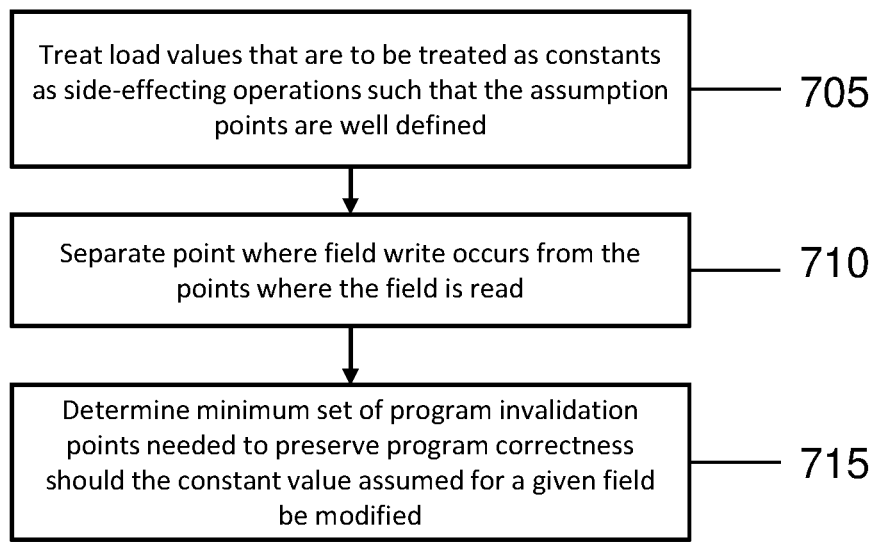
FIG. 7 shows a flowchart of an exemplary method in accordance with aspects of the invention.

FIG. 7 shows steps that, in embodiments, the JIT compiler 120 carries out when compiling.

In step 705, the computer device 100 treats the load of values that are to be treated as constants as side-effecting operations (operations that modify a state outside of the operations' current environment), such that the assumption points are well defined. In embodiments, the side-effecting operations allow processing to transfer outside of the implementation generated by compiler 120 to the interpreter 130. In some compiler intermediate representations (IRs), there is no difference between the representation of side-effecting and non-side-effecting operations. In embodiments, the compiler 120 uses a tree-based IR where the roots of the trees are the only points where side-effects may occur and these side-effecting operations are linked together in an ordered sequence which reflects the order in which the side-effects occur. In embodiments, loads are normally considered non-side-effecting. When a field is to be constant folded, the load is treated as a side-effecting operation so it appears under its own treetop.

At step 710, the JIT compiler 120 separates the points where field writes can occur (i.e., where the field value assumptions can be invalidated) from the points where the field would be read to increase the opportunity for optimization. In embodiments, the set of points where the interpreter 130 informs compiled code that an invalidation has occurred are well-defined.

At step 715, in embodiments, FEAR analysis is used to determine the set of invalidation points which immediately dominate the assumption points. This provides the minimum set of program points where logic to transition execution to the interpreter 130 are inserted to preserve program correctness should the constant value assumed for a given field be modified. In embodiments, as invalidations are identified at the class level, on stack replacement (OSR) transitions are registered against the classes of any fields they protect. The virtual machine 110 announces the class in the event of a static final field modification, triggering the JIT runtime infrastructure to patch any OSR transitions to an enabled state if they had registered an assumption (an assumed constant) against the announced class.

In embodiments, the process of triggering assumption invalidations will vary. In embodiments, when a write to a static final field after initialization is detected, the virtual machine (for example, the virtual machine 110) marks the modified field's class accordingly, halts any threads executing generated code once their invalidation points have been reached, and notifies the JIT compiler 120. Upon notification, the JIT compiler 120 checks the list of currently active assumptions for the marked class and trigger patching logic for any points affected by the invalidation. A transition to the interpreter will occur should execution reach one of these points, which prevents execution of any invalidated code.

Embodiments with static final field folding have shown the potential for a roughly 1% throughput performance increase running a particular benchmark sample on an x86 server system. The ability to speculate on the value of static final fields is beneficial to the implementation of variable handles in certain programs, particularly those that call for variable handle instances to be stored in static final fields to facilitate optimization. Embodiments show orders of magnitude performance improvement in variable handle microbenchmarks.

In embodiments, a computer-implemented process for safe compile-time folding of assumed constant values includes: in response to detecting a write to a static final field, by an enhances interpreter and associated runtime infrastructure of a compiler (for example, the compiler 120), recording, by the associated runtime infrastructure, fields that have been modified; notifying the associated runtime infrastructure of the compiler of the write to trigger any transitions required to prevent running code where a value of the field was speculated to be constant at compile time; identifying a load of values assumed constants as side-effecting operations, such that assumption points are well defined; separating points where field writes can occur, wherein field value assumptions can be invalidated, from points where the field would be read; and analyzing the points to determine a set of invalidation points that immediately dominate assumption points to provide a minimum set of program points where logic to transition execution to the interpreter (for example, the interpreter 130) is to be inserted to preserve program correctness should a value assumed for a given field be modified.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
selecting, by a computer device, a set of fields in a program which are marked as final fields to be treated as constants;
adding, by the computer device, detection logic to the program, the detection logic including a process that detects writes to the final fields to be treated as constants;
compiling, by the computer device, the program into compiled code;
executing, by the computer device, the compiled code;
detecting, by the computer device, a write to a first one of the final fields to be treated as constants; and
transitioning, by the computer device, execution of the compiled code from the compiled code to an interpreter for processing by compensation code that operates on the first one of the final fields to be treated as constants.

2. The computer-implemented method of claim 1, further comprising running, by the computer device, the compensation code.

3. The computer-implemented method of claim 1, wherein the compensation code treats as a variable the first one of the final fields to be treated as constants.

4. The computer-implemented method of claim 1, wherein the compiling is performed by a just-in-time compiler running on the computer device.

5. The computer-implemented method of claim 1, further comprising storing, by the computer device, in a single bit on a class, a record of the write to the first one of the final fields to be treated as constants,
wherein the write to the first one of the final fields to be treated as constants is performed after the executing.

6. The computer-implemented method of claim 1, further comprising recording, by the computer device, the first one of the final fields to be treated as constants as a field that has been modified.

7. The computer-implemented method of claim 1, further comprising processing, by the computer device, the compiled code for processing that does not write to the final fields to be treated as constants.

8. The computer-implemented method of claim 1, wherein the computer device includes software provided as a service in a cloud computing environment.

9. A computer program product, the computer program product comprising a computer readable storage medium having program instructions embodied therewith, the program instructions executable by a computing device to cause the computing device to:
select a set of fields in a program which are marked as final fields to be treated as constants;
add detection logic to the program, the detection logic including a process that detects writes to the final fields to be treated as constants, the detection logic being added to a bytecode interpreter loop and a Java Native Interface;
compile the program into compiled code by a compiler;
execute the compiled code;
detect a write to a first one of the final fields to be treated as constants; and
transition execution of the compiled code from the compiled code to an interpreter for processing by compensation code that operates on the first one of the final fields to be treated as constants,
wherein the compiler uses a tree-based intermediate representation (IR),
execution of the compensation code only occurs in roots of trees in the IR, and different occurrences of the execution of the compensation code are linked together in an ordered sequence which reflects an order in which the occurrences are executed.

10. The computer program product of claim 9, further comprising program instructions executable by the computing device to cause the computing device to run the compensation code.

11. The computer program product of claim 9, wherein the compensation code treats as a variable the first one of the final fields to be treated as constants.

12. The computer program product of claim 9, wherein the compiling is performed by a just-in-time compiler running on the computer device.

13. The computer program product of claim 9, further comprising program instructions executable by the computing device to record the first one of the final fields to be treated as constants as a field that has been modified.

14. The computer program product of claim 9, further comprising program instructions executable by the computing device to process the compiled code for processing that does not write to the final fields to be treated as constants.

15. A system, comprising:
a processor, a computer readable memory, and a computer readable storage medium;
program instructions to select a set of fields in a program which are marked as final fields to be treated as constants;
program instructions to add detection logic to the program, the detection logic including a process that detects writes to the final fields to be treated as constants;
program instructions to compile the program into compiled code;
program instructions to execute the compiled code;
program instructions to detect a write to a first one of the final fields to be treated as constants; and
program instructions to transition execution of the compiled code from the compiled code to an interpreter for processing by compensation code that operates on the first one of the final fields to be treated as constants,
wherein the program instructions are stored on the computer readable storage medium for execution by the processor via the computer readable memory.

16. The system of claim 15, further comprising program instructions to cause the processor to run the compensation code.

17. The system of claim 15, wherein the compensation code treats as a variable the first one of the final fields to be treated as constants.

18. The system of claim 15, wherein the compiling is performed by a just-in-time compiler running on the processor.

19. The system of claim 15, further comprising program instructions to record the first one of the final fields to be treated as constants as a field that has been modified.

20. The system of claim 15, further comprising program instructions to process the compiled code for processing that does not write to the final fields to be treated as constants.

\* \* \* \* \*